(12) United States Patent
Fernandez-Alonso et al.

(10) Patent No.: US 7,865,173 B2
(45) Date of Patent: Jan. 4, 2011

(54) METHOD AND ARRANGEMENT FOR AUTHENTICATION PROCEDURES IN A COMMUNICATION NETWORK

(75) Inventors: Susana Fernandez-Alonso, Madrid (ES); Luis Barriga, Skarpnäck (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 957 days.

(21) Appl. No.: 11/615,362

(22) Filed: Dec. 22, 2006

(65) Prior Publication Data
US 2008/0009265 A1    Jan. 10, 2008

(30) Foreign Application Priority Data
Jul. 10, 2006  (SE) ..................... 0601554
Dec. 22, 2006  (WO) ................ PCT/SE2006/50625

(51) Int. Cl.
*H04M 1/66*   (2006.01)
*H04M 1/68*   (2006.01)
*H04M 3/16*   (2006.01)

(52) U.S. Cl. ..................... 455/411; 455/410
(58) Field of Classification Search ................ 455/441
See application file for complete search history.

(56) References Cited

U.S. PATENT DOCUMENTS 7,027,818 B2 * 4/2006 Bos et al. ................. 455/452.2
7,079,499 B1   7/2006 Akhtar et al.
7,142,876 B2 * 11/2006 Trossen et al. .......... 455/456.3
2003/0163733 A1  8/2003 Barriga-Caceres
2004/0128393 A1  7/2004 Blakley, III et al.

FOREIGN PATENT DOCUMENTS

WO    WO 0221464 A2    3/2002
WO    WO 2004064442 A1  7/2004
WO    WO 2006045402 A1  5/2006

* cited by examiner

*Primary Examiner*—Ajit Patel
(74) *Attorney, Agent, or Firm*—Roger S. Burleigh

(57) ABSTRACT

The present invention is related to an authentication method and arrangements in a communication system including a Subscriber (50) with a terminal (51), an Operator Node (52) and a Service Provider Node (53), which authentication method is based on an SLA agreement between the Operator (OP) and the Service Provider (SP). The method includes that the Subscriber (50) with terminal (51) performs (5) strong authentication with the Operator Node (52) acting as Registration Authority OP(RA). After the strong authentication is performed by the Operator Node (52) a Mobile Strong Authentication Assertion MSAA is generated (6) and transmitted to the Service Provider Node (53) for validation. By this method the authentication is being delegated from the Service Provider to the Mobile Operator.

10 Claims, 6 Drawing Sheets

Certificate embodiment

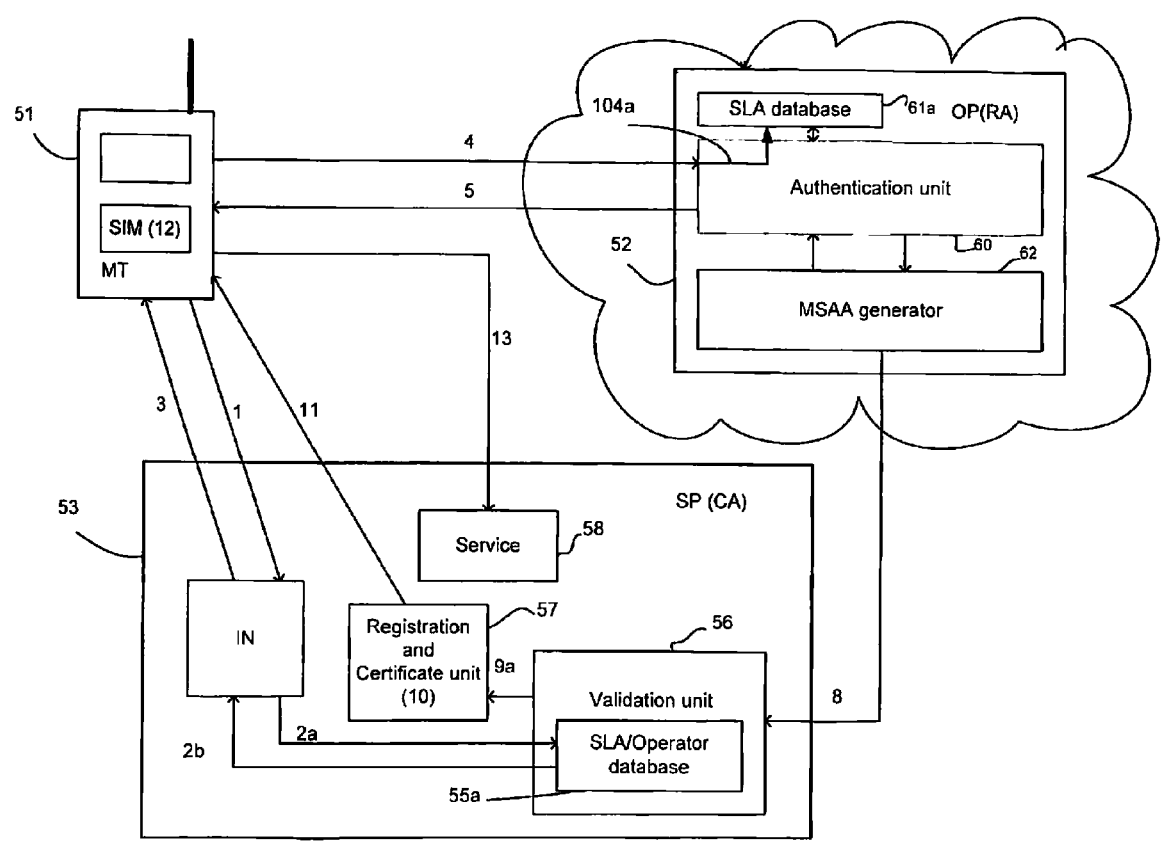
Figure 1    Certificate embodiment

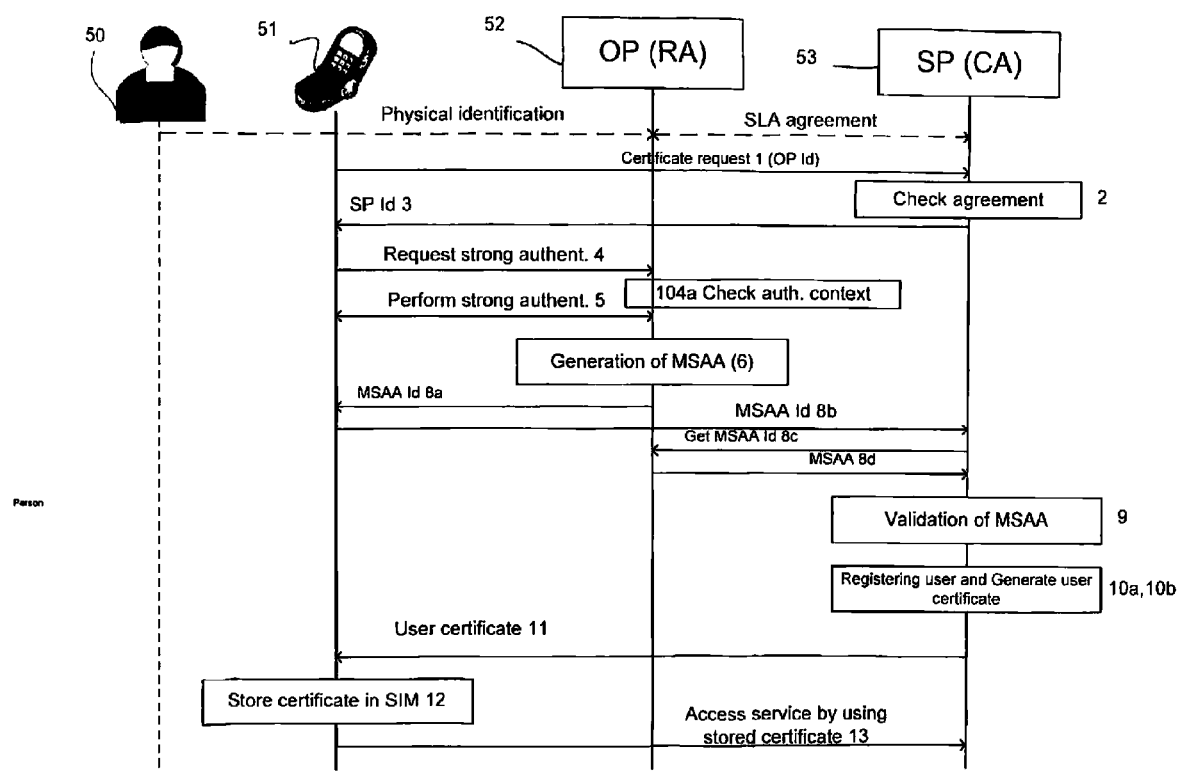
Figure 2 a   Certificate embodiment, through terminal

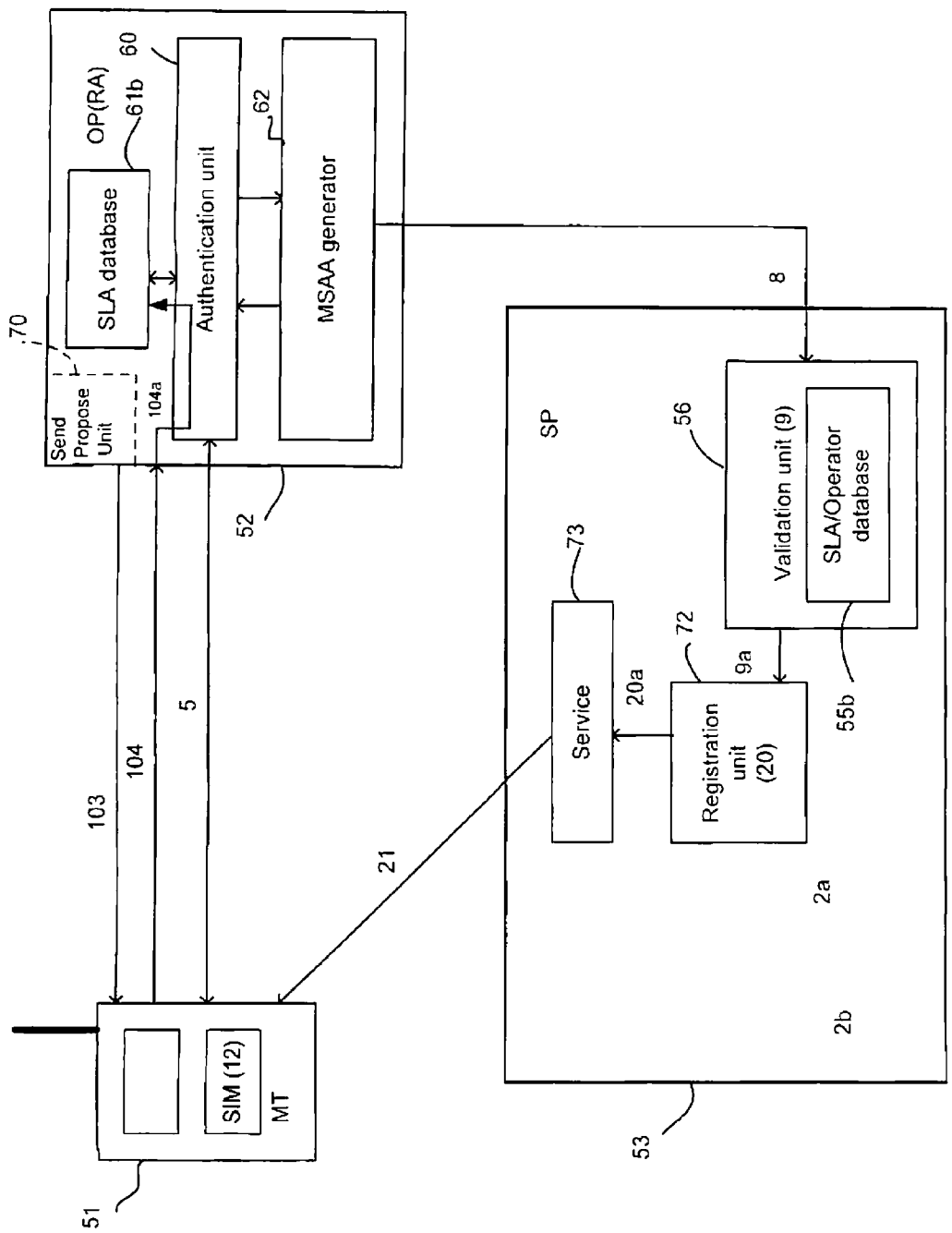
Figure 3   Service embodiment

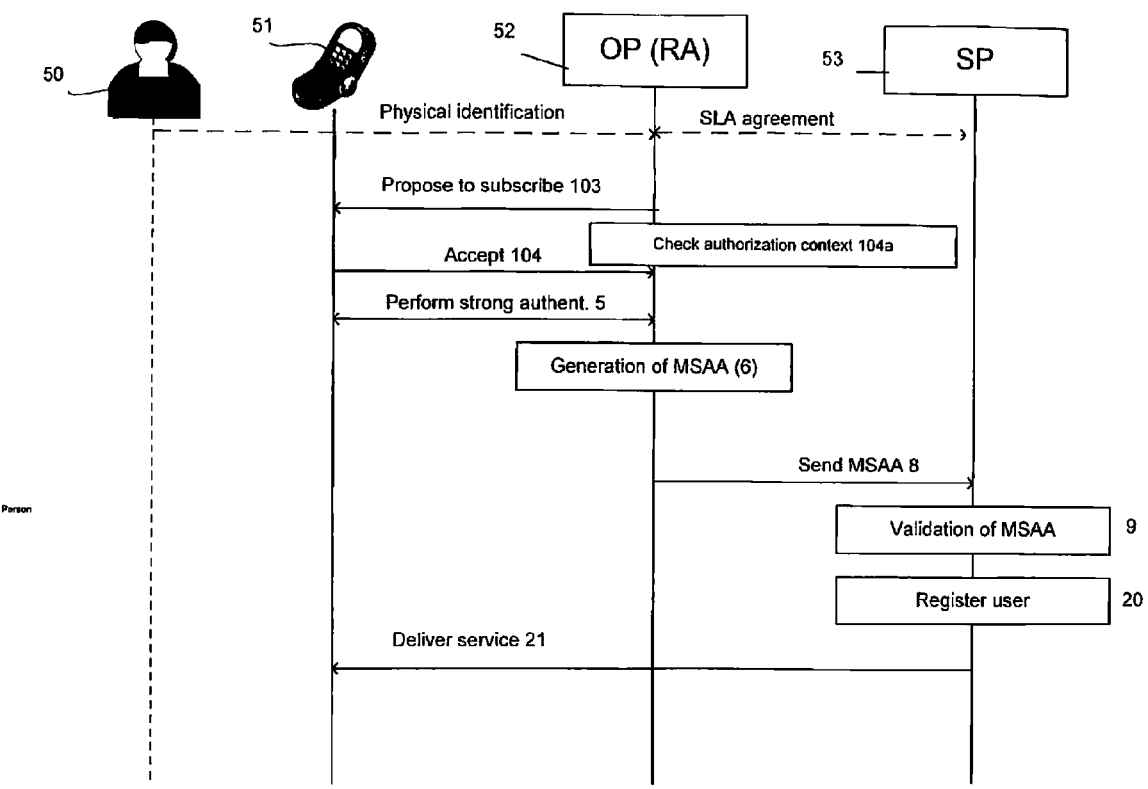
Figure 4    Service request

61a SLA Database

| SP Id | Authentication context | Time duration |
|---|---|---|
| SP 1 | xxxx | 10 minutes |
| SP2 | yyyy | 30 minutes |
| SP3 | zzzz | 4 hours |

Fig. 5a

55a SLA/Operator Database

| SLA agreem. ID | Operator Id | Authen. context |
|---|---|---|
| 1 | Operator A | xxxx |
| 2 | Operator B | xxxx |
| 3 | Operator C | xxxx |

Fig. 5b

61b SLA Database

| SP Id | Authent. context | Service offered |
|---|---|---|
| SP 4 | qqqq | Subscription A |
| SP 5 | rrrr | Subscription B |
| SP 6 | ssss | Subscription C |

Fig. 5c

55b SLA/Operator Database

| Operator | Service offered | Authen. context |
|---|---|---|
| Operator A | Subscription A | qqqq |
| Operator B | Subscription B | rrrr |
| Operator C | Subscription C | ssss |

Fig. 5d

METHOD AND ARRANGEMENT FOR AUTHENTICATION PROCEDURES IN A COMMUNICATION NETWORK

CROSS-REFERENCE TO RELATED APPLICATIONS

This application claims the priority of PCT/SE2006/050625 filed on Dec. 22, 2006, which claims the benefit of Swedish Provisional Application No. 0601554-9 filed on Jul. 10, 2006, the disclosure of which is incorporated herein by reference.

TECHNICAL FIELD

The invention relates to authentication in a communication network including a Mobile Operator having a trusted relationship with subscribers and Service Providers doing critical business as well as non critical business and leveraging services to the mentioned subscribers.

BACKGROUND

The Public Key Infrastructure PKI(X) standards defined by IETF Public Key Infrastructure Working Group http://www.ietf.orq/html.charters/pkix-charter.html define the technology for digital certificate lifecycle, from issue to revocation. Several actors are defined in PKI RFC2510:Internet X.509 Public Key Infrastructure Certificate Management Protocols.

Certification Authority (CA)—The entity that issues digital certificates and puts its name in the issuer field of a digital certificate.

Registration Authority (RA)—A separate entity that can handle supporting tasks such as personal physical authentication, token distribution revocation reporting, name assignment, backup of key pairs etc.

In known systems the RA and CA roles are taken by the same organization which is simple from the PKI management point of view. For instance a Service Provider SP doing critical business, such as a bank, has both roles and does the authentication in the RA role and generates the certificate in the CA role.

In known systems the Service Provider SP establishes (bootstraps) trust by registration the end user using face-to-face procedures involving physical validation of documents, filling forms with personal information and optionally requesting third-party references. In other words the Service Provider SP is forced to play the Registration Authority RA role. The cost associated with registration procedures is often rather high, but unavoidable since there are no other working solutions.

In general, the RA can be operated by a different organization that offers its registration services to one or more CA's. However there are no disclosure on how to implement such a split of Registration Authority RA and Certificate Authority CA.

WPKI is a Swedish project involving banks, operators and governmental organization (see WPKI.NET). The project is defining and specifying a secure hard identity that can be used in banking, access to $24^{th}$ governmental online services, enterprise services among others. Important enablers in WPKI are: PKI, secure phone environment and SWIM. Due to previous deficiencies with soft PC-based certificates that were easy to steal by viruses.

The Liberty Alliance LA project is a business driven project with participation from more than 100 companies ranging from Internet Service providers, mobile network operators and financial institutions. The purpose is to define Digital Entity standards that allow building federations. In the most common scenario, one federation consists of an Identity Provider (IdP) that centralizes authentication and several Service Providers (SP) that delegate authentication to the IdP.

In the case of a mobile network operator (MNO) that plays the IdP role, this means that users that want to access a SP need to contact the operator each time a service is requested, authenticate with *SIM, get an authentication assertion that is then presented to the SP. This model in Liberty Alliance, however, requires that the user/subscriber has an account with the Service Provider SP, which requires that the user/subscriber has separately established a trust relation with the SP without involvement of the operator. This is sub-optimal and not user friendly Thus, centralized delegated authentication as in federated models like Liberty Alliance does not meet all market needs for all Service Providers since there are drawbacks mentioned.

Generic Bootstrapping Architecture (GBA) defined in 3GPP standard provides the mechanisms to allow applications to authenticate users making use of shared keys that a Mobile Network Operator has negotiated with the user during the Authentication and Key Agreement (AKA) procedure. GBA considers also the case where the Service Provider is a CA that issues certificates to be used by other applications. As in the Liberty case, GBA requires an independent trust relation with the SP. The SP still has to authenticate the subscriber, as the MNO acts uniquely as a key generator, and thus no authentication assertion is generated. On the other hand, the authentication carried out by the MNO in order to generate the appropriate keys is limited to AKA.

In prior art systems the concept of strong authentication is used. Due to pervasive usage of weak authentication methods, e.g. user-friendly passwords, users of Internet services have been the target of increasing fraud such as hacking, identity theft, masquerade attacks and loss of privacy. The need for stronger authentication methods has increased over time for different situations. Strong Authentication connotes a stringent level of security that combines different authentication mechanisms to validate a user's identity when accessing a software application or network. It represents a foundational element of trusted networks where multiple business partners can securely share confidential information.

SUMMARY

It is an object of the invention to provide a method and arrangements to make it possible for the Service Provider SP to delegate the enrollment and security bootstrapping, authentication, procedures to the Mobile Operator.

This and other objects are met by the invention as defined by the accompanying claims.

The invention relates to an authentication method in a communication system including a Subscriber with a terminal, an Operator Node and a Service Provider Node, which authentication method is based on an SLA agreement between the Operator and the Service Provider. The method includes the following steps. The Subscriber with terminal performs strong authentication with the Operator Node which thus acts as Registration Authority RA. Then the Operator Node generates a Mobile Strong Authentication Assertion MSAA, which is transmitted to the Service Provider Node. Finally in the basic idea the MSAA is validated by the Service Provider SP.

According to a first embodiment (certificate embodiment) the following steps are executed prior to performing the strong assertion step. A service request is sent to the Service Provider Node from the terminal and the request includes the Operator Node identity in order to enable checking that the Operator has an SLA agreement with the Service Provider. If there is an SLA agreement then the Service Provider node Identity is sent to the terminal whereby a Request for strong authentication is being sent to the Operator Node from the terminal.

If the MSAA is valid the authentication method according to the invention further includes the steps of registering in the Service Provider Node the subscriber and delivering the service from the Service Provider Node to the terminal of the subscriber.

The authentication method according to the certificate embodiment further includes that the registering is followed by generating in the Service Provider Node a user certificate which user certificate is being transmitted to the terminal and stored in the terminal.

According to a second embodiment (certificate embodiment) the following steps are done prior to the performing step. Sending a propose to subscribe for a service from the Operator Node to the terminal and sending as a response an accept information in return.

The invention further relates to an authentication method in an Operator Node OP within a communication system including a subscriber having a trust relation with the operator OP and a Service Provider Node SP, which authentication method is based on an SLA agreement between the Operator OP and the Service Provider SP. The Operator node receives a Request for authentication which request includes the Service Provider Node Identity. A check is done what authentication context is used for the received Service Provider Node. The authentication is performed in accordance with the authentication context. After authentication is performed a Mobile Strong Authentication Assertion MSAA is generated and transmitted to the Service Provider node, whereby the Operator Node is acting as Registration Authority for the Service Provider.

Corresponding to the authentication method in the Operator Node is an arrangement in the Operator Node OP (52), which includes an SLA database for checking what authentication context to be used for a service request. Also included in the arrangement is an Authentication unit for performing of the authentication in accordance with the authentication context and an MSAA generator for generation of the MSAA and sending it to the Service Provider Node, whereby the Operator Node act as Registration Authority (RA) for the Service Provider (SP).

In the claims is further defined an authentication method in a Service Provider Node within a communication system including a subscriber with a terminal and an Operator Node. The method which is based on an SLA agreement with the Operator includes the following steps. A service request from the terminal is received in the Service Provider Node. The request includes the Operator Node identity OP Id. Then it is being checked in the Service Provider node that the Operator node identity relates to an operator having an agreement with the Service Provider SP. If there is an agreement then: information is sent to the terminal about the Service Provider and an MSAA generated by the Operator is received in the service provider node which node is validating the received MSAA. Then the user is being registered and the service is delivered to the terminal.

In the first embodiment the service is a certificate and in the second embodiment the service is a subscription.

Further a Service Provider Node arrangement is claimed and the SP node arrangement includes a validation unit for validation of a received Mobile Strong Authentication Assertion, a registration unit for registering the subscriber upon validation of the MSAA; whereby the authentication of the subscriber has been delegated to the Operator and the validation is done in the Service Provider Node.

The main advantage of the invention is that the Service Provider can delegate the burden of performing authentication to a trusted party that already has a trusted relation with the customer of the Service Provider SP. This is from a business point a very efficient way of doing the authentication since the Operator often has a more close relationship with the subscriber than what a Service Provider may have.

A further advantage is that the strong authentication performed by the Mobile Operator can be re-used by a SP for on-line trust bootstrapping in order to issue a new certificate that can be used by said Service Provider.

A second further advantage is that the method and arrangements according to the invention also can be used for other tasks. The operator can be used by the Service Provider as a new via for gaining new subscriptions.

The invention will now be described in more detail with reference to exemplary embodiments thereof and also with reference to the accompanying drawings.

BRIEF DESCRIPTION OF THE DRAWINGS

FIG. 1 illustrates a block diagram of the interacting nodes in a certificate embodiment of the invention.

FIG. 3 illustrates a block diagram of the interacting nodes in a service embodiment of the invention.

FIG. 4 is a sequence diagram illustrating signals in the service embodiment of the invention.

FIG. 5*a* is a more detailed figure of the SLA database 61*a* of FIG. 1.

FIG. 5*b* is a more detailed figure of the SLA/Operator database 55*a* of FIG. 1.

FIG. 5*c* is a more detailed figure of the SLA database 61*b* of FIG. 3.

FIG. 5*d* is a more detailed figure of the SLA/Operator database 55*b* of FIG. 3.

DETAILED DESCRIPTION

Figure 2:
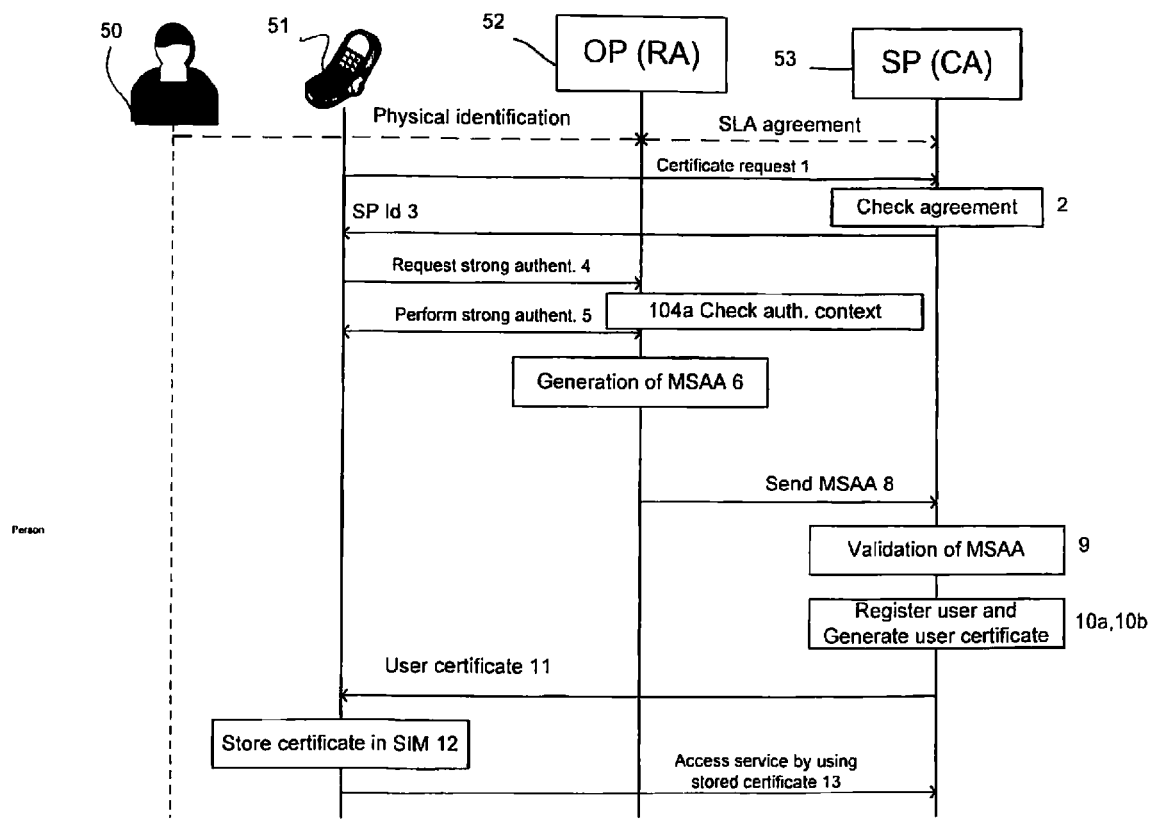
FIG. 2*a* is a sequence diagram illustrating signals in a first alternative of certificate embodiment of the invention.
FIG. 2*b* is a sequence diagram illustrating signals in a second alternative of the certificate embodiment of the invention.

In a communication system several parties are involved when delivering services from a Content Provider to a mobile subscriber. The parties involved in a system according to the invention are the following. The first part is an Operator OP or more specifically a Mobile Network Operator MNO with connected subscribers having at least one terminal. The second part is a Service Provider with strong security requirements for instance a bank, a financial institution or governmental agencies and the third part is the mobile subscriber, interested in using the services offered by the Service Providers. One advantage of the invention is that the subscriber without having an account with the Service Provider, can anyhow receive services from the Service Provider. This is possible by utilization of the invention which teach how the Mobile Operator takes on the role of being the Registration Authority RA for the Service Provider. This is implemented in the way that the Mobile Operator is performing the authentication instead of handling it according to prior art where the Service Provider does the initial authentication and registration.

The different embodiments of the invention will be described in more details with references to the figures.

FIG. 1 describes a telecommunication network with the basic parts of a certificate embodiment of the inventive system and how the parts interact. The basic parts include a Mobile Terminal MT 51, an Operator Node OP(RA) 52 and a Service Provider Node SP(CA) 53, which can all communicate with each other in the telecommunication network.

For clear understanding of the invention FIGS. 2a and 2b is described together with description of the arrangement in FIG. 1. In FIGS. 2a and 2b it is disclosed by use of dotted lines that a subscriber 50 initially does a physical identification with the home operator by presenting his identity card, driving license or equivalent. This identification is a prerequisite for the invention to be implemented since it will be part of a Service Level Agreement SLA between the Operator OP and the Service Provider SP. This identification is thus fundamental for the Service Provider to delegate the Registration Authority to the Operator. A further prerequisite for the invention is that the Operator OP and the Service Provider SP has a Service Level Agreement SLA which includes the authentication context required by the Service Provider. The SLA agreement can also include further information about the service from the Service provider, for instance the time duration for an authentication done by the Mobile Operator.

In the first step of the sequence diagrams in FIGS. 2a and 2b a service request 1 is sent from the terminal 51 to the Service Provider Node 53. The service request is in a first embodiment exemplified by a certificate request. The service request includes the Operator Node identity OP Id for the home operator of the subscriber. In FIG. 1 this service request 1 is also disclosed with an arrow from the terminal 51 to an IN unit in the Service Provider Node 53. The next step 2 in the sequence diagram is to check in the Service Provider Node 53 that there is a Service Level Agreement SLA between the Service Provider SP and the Operator OP. This is disclosed in FIG. 1 with arrows 2a and 2b from the IN unit to an SLA/Operator database 55a which includes information on all SLA agreements and optionally also the corresponding authentication context if the service provider has a selection for different operators. When the check 2 is done the Operator Identity OP Id is searched for in the database 55a and it is checked that it has a matching SLA Identity. The SLA/Operator database 55a is in FIG. 5b further shown in details. It includes an Operator Identity (Operator A, Operator B and Operator C) of the mobile operator and Identities of the SLA agreement (1,2,3) and optionally also the authentication context (xxxx) according to the agreement.

If the checking step 2 results in a positive answer which means that there is an agreement then in step 3 the Service Provider Identity SP Id is being transmitted to the terminal 51 from the Service Provider Node 53. This step 3 is also indicated in FIG. 1. The received SP Id can now be used by the Mobile Terminal 51 of the subscriber for initiating strong authentication with the home mobile operator, which in this example is indicated with reference number 52. From the terminal 51 there is sent a request for strong authentication 4 to the home Operator Node 52. The request 4 includes information about the Service Provider Node ID SP Id which can be used by the Operator OP when determining in step 104a which authentication context to be used.

The request 4 for strong authentication is also disclosed with an arrow in FIG. 1. In FIG. 1 it is disclosed that the request 4 is sent to an Authentication unit 60 in the Operator Node 52. The Authentication unit 60 initially determines (step 104a) from a connected SLA Database 61a (shown in details in FIG. 5a) which authentication context is applicable for the Service Provider Node ID SP Id received on the request 4. According to the example in FIG. 5a the authentication context is xxxx for a first Service Provider SP 1 which may be the SP 53 in this example. The authentication unit 60 performs authentication, in step 5 in the figures, in accordance with the determined xxxx authentication context. This can also be expressed in a way that according to the invention the Operator OP takes on the role of the Registration Authority (RA) which role in prior art systems has been done by the Service Provider. However, the authentication must be trusted by the Service Provider who requires that the authentication is strong. Such strong authentication can be performed by the Mobile Operator according to the invention.

The performance of the strong authentication in step 5 is for example done in the following way by the authentication unit 60. This strong authentication will carry out at least three authentications. These can for example be xxxx which in one example is done in the following order 1,2,3 and described below.

1.) PIN code authentication. As this already works, this PIN code permits the subscriber to access to his terminal.
2.) SIM based authentication. The user of subscriber 50 is challenged according to the security data included in both the SIM and the Authentication Center in the operator network and
3.) PKI based authentication. The operator can act as a local Certificate Authority for this subscriber. In this case the SIM (SWIM) already includes a key pair and a certificate issued by the operator OP.

Other mechanisms are also possible for instance biometrical authentication especially instead of the PKI authentication.

Based on all these mechanisms, and other credentials and/or identifiers that the operator is aware of, the Operator Node 52 will generate a Mobile Strong Authentication Assertion (MSAA) in the MSAA generator 62 that proves that the user is really who he claims to be. This assertion MSAA includes at least information about the kind of authentication that has been carried out and the time duration of the assertion. The assertion only includes information on how the authentication was done, by whom, when and how long it is valid. In the case that PKI is used as part of the strong authentication, public key can be transported also. Other information is provided separately using other type of assertions.

In next step 8, 8a, 8b, 8c and 8d the generated MSAA is being transmitted to the Service Provider Node 53. There are two alternative ways of transmitting the MSAA. The first alternative, via the terminal, is disclosed in FIG. 2a as steps 8a, 8b, 8c and 8d and the second alternative, directly to the Service Provider Node 53, is disclosed in FIG. 2b and in FIG. 1 as step 8. In the first alternative in step 8a an MSAA identifier MSAA Id is sent to the terminal 51 from the Operator Node 52. In the next step 8b the same MSAA Id is sent from the terminal to the Service Provider Node 53. In a further step 8c the Service Provider Node sends a message Get MSAA including the identifier MSAA Id and then follows the last transmitting step 8d where the MSAA itself is sent to the Service Provider Node 53 from the Operator Node 52. Upon the reception of the MSAA in the Service Provider Node 53, the Mobile Strong Authentication Assertion MSAA is used by the validation unit 56 to make a validation, step 9 in FIG. 2a. The validation unit 56 is disclosed in FIG. 1. If the validation fulfills the security expectations connected with the authentication context applicable then the Service Provider Node 53 has a guarantee that this subscriber 50 is really who he claims to be. It is to be underlined that this validation is done without an account for the subscriber 50 with the Service Provider SP as mentioned before. Instead the MSAA assertion is being used by the Service Provider in order to open an account and register the user. Thanks to the inventive procedures described above where the Operator OP does the authentication and then transmits the MSAA to the Service Provider where it is validated the Service Provider can have full confidence in delegating the authentication procedure to the Operator in accordance with a SLA agreement. This delegation is very efficient since it saves resources for the Service Provider and the delegation creates a new important task for the Operator. This new Operator function of performing authentication on behalf of a Service Provider may generate business for the Operator.

After the validation step 9 in FIGS. 2a and 2b there is one step 10a in which the subscriber 50 is registered in the Service Provider Node 53. In the certificate embodiment disclosed in FIGS. 2a and 2b the registration is followed by a second step 10b comprising generation of a user certificate which is transmitted/delivered in step 11 to the terminal 51 where it is stored in the SIM card 12. In FIG. 1 the user certificate is generated in a Registration and Certificate unit 57 upon a message 9a from the validation unit 56. Step 11 in FIG. 1 discloses that the generated certificate is transmitted to the terminal 51 where it is stored in the SIM card of the terminal.

From this moment onwards, when the subscriber wants to access a service from the Service Provider Node 53 he presents the certificate to the Service Provider Node 53, which is step 13 in FIGS. 2a and 2b. In FIG. 1 a Service node 58 is disclosed and when in step 13 the service is accessed it is the service node 58 that is contacted and the certificate is disclosed to the Service Node. This is in accordance with prior art technology and not further disclosed here.

If a key pair has been pre generated by the Operator Node 52 and included in the SIM card the user will be able to digitally sign the information presented to the Service Provider Node 53. The user key pair could be permanent. When the key pair is pre generated by the Operator, the public key should be sent to the Service Provider as part of the MSAA.

Some Service Providers that are not involved in critical business as described in the certificate embodiment will still require a high trust model with their users. Also in this service model end to end security is required. A service embodiment will now be described in connection with FIGS. 3 and 4. For example the Service Provider may be a Company providing subscriptions for internet magazines and the service is delivery of the magazines.

In this service embodiment the prerequisites are the same as in the certificate embodiment. The subscriber with a terminal is a subscriber of an Operator and has done a physical identification at the operator. Also a prerequisite is that there is an SLA agreement between the Service Provider and the Operator.

The Service Provider offers determined services that require a subscription of the user according to the example above. The Service Provider is willing to delegate the burden of identification and authentication process needed to create such subscriptions to operators. At the same time it is possible also to let the operators offer these services to their subscribers.

According to FIGS. 3 and 4 a service embodiment is described in which the Operator Node 52 sends an "advertisement" or "propose to subscribe" to the terminal 51, step 103, from a Send Propose unit 70. This information in step 103 can for instance be sent by using Short Message Service SMS or Multimedia Message Service MMS. The subscription which in this case is the service is thus a subscription from the Service Provider Node 53. The subscriber 50 of the Operator OP returns an accept answer, via SMS or MMS, in step 104 to the Operator Node 52.

In order to create the subscription in the Service Provider Node 53, the user will be requested to carry out a strong authentication with his mobile operator. The strong authentication is done according to the authentication context in the SLA data base 61b in FIG. 3 and FIG. 5c. The database 61b has information about the authentication context for different Service Providers (SP4, SP5, SP6) and their services offered. The SLA database 61b is described in a separate drawing in FIG. 5c. What authentication context to use is checked with the SLA Database 61b in a step 104a shown in FIG. 3 and FIG. 4. The authentication context will depend on the kind of service offered and how strong the authentication should be. For most cases which are non critical as in this example the authentication context in step 1 and 2 described earlier would suffice, i.e. the PIN code authentication and the SIM based authentication. Based on all these mechanisms and other credentials and/or identifiers that the operator is aware of the Operator Node 52 will be able to generate a Mobile Strong Authentication Assertion MSAA to prove that the user is really who he claims to be. The generation of the MSAA is indicated in FIG. 4 in step 6. This assertion should at least include information about the kind of authentication that has been carried out and the time during which such assertion is valid. Thus, the assertion is a pure authentication assertion which the Service Provider SP can utilize for opening of an account for the user, which is equivalent to register the user. After registration the service can be delivered.

The MSAA will be transmitted to the Service Provider Node 53, which is indicated in FIGS. 3 and 4 with step 8. However, also in this service embodiment it is possible to transmit the MSAA via the terminal as described in connection with the certificate embodiment in FIG. 2a. Upon reception of the MSAA a validation unit 56 in the Service Provider Node 53 starts to do the validation, which is indicated in step 9 in FIG. 4. The validation is done in accordance with information stored in a SLA/Operator database 55b having information on the service offered and the applicable authentication context, for instance qqqq for Operator A when the service offered is Subscription A. The database 55b is further described in a drawing in FIG. 5d.

When validation is finished and validation is OK then the user is registered which is indicated in step 20 in FIG. 4. The registration is done in a Registration Unit 72 in the Service Provider Node 53 disclosed in FIG. 3.

From this moment onwards, the user has a subscription with the Service Provider and thus can start using the subscribed services. The Mobile Operator will not have any other security role during the usage of the service. Still the Service Provider can take advantage of the Mobile Operator for notifications of services (step 103) towards its subscribers.

After registration in step 20 in FIG. 4 the service is delivered in step 21 from a service unit 73 in FIG. 3 in the Service Provider Node 53 disclosed in FIG. 3. The service is delivered to the terminal 51 which is disclosed in FIGS. 3 and 4. The registration, step 20, is done in a registration unit 72 connected to the service unit 73 for sending information 20a that the registration is finished and the service can be delivered. Depending on the kind of service to be provided, the Service Provider will make use of different end to end security mechanisms for the access of the user to the service. However, these security mechanisms are in accordance with prior art mechanisms and are not part of the invention and thus not described in details.

This service embodiment invention can be used advantageously by the Service Provider for delegating security responsibilities to the Mobile Operator and at the same time the Service Provider gains some benefits such as obtaining new subscriptions and delegating the identification process. The success of the operator role will be based on providing Strong Authentication Mechanisms and thus the Operator is perceived as a security partner to the Service Provider.

The invention claimed is:

1. An authentication method in a communication system including a Subscriber with a terminal, an Operator Node and a Service Provider Node, which authentication method is based on an SLA agreement between the Operator and the Service Provider, the method comprising the following steps:
sending a service request to the Service Provider Node from the terminal, the request includes the Operator Node identity;
checking in the Service Provider Node that the Operator node identity relates to an Operator having an SLA agreement with the Service Provider and
if there is an SLA agreement then sending the Service Provider node Identity to the terminal and
sending a Request for strong authentication from the terminal to the Operator Node, the request includes the Service Provider Node Identity;
the Subscriber with terminal performing strong authentication with the Operator Node acting as Registration Authority;
generating by the Operator Node a Mobile Strong Authentication Assertion MSAA;
transmitting the generated MSAA to the Service Provider Node; and
validating in the Service Provider node the MSAA.

2. The authentication method according to claim 1 further comprising the following steps prior to the performing step:
sending a propose to subscribe for a service from the Operator Node to the terminal; and
sending accept information on the propose from the terminal to the Operator Node.

3. The authentication method according to claim 1 further comprising in that the transmitting of the generated MSAA to the Service Provider Node is done via the terminal.

4. The authentication method according to claim 1 further comprising in that the strong authentication is performed in accordance with the authentication context according to the SLA agreement with the Service Provider.

5. The authentication method according to claim 1 further comprising the following steps if the MSAA is valid then
registering in the Service Provider Node the subscriber; and
delivering the service from the Service Provider Node to the terminal of the subscriber.

6. The authentication method according to claim 5 further comprising that the registering is followed by
generating in the Service Provider Node a user certificate which user certificate is being transmitted to the terminal and stored in the terminal.

7. An authentication method in an Operator Node within a communication system including a subscriber having a trust relation with the operator and a Service Provider Node, which authentication method is based on an SLA agreement between the Operator OP and the Service Provider, the method comprising the following steps:
receiving a Request for authentication, the request includes the Service Provider Node Identity;
checking what authentication context is used for the received Service Provider Node;
performing authentication in accordance with the authentication context for the received Service Provider Node;
generating a Mobile Strong Authentication Assertion MSAA and
transmitting the generated MSAA to the Service Provider node, whereby the Operator Node is acting as Registration Authority for the Service Provider.

8. An authentication method in a Service Provider Node within a communication system including also a subscriber with a terminal and an Operator Node, the method is based on an SLA agreement with the Operator comprising the following steps:
receiving a service request from the terminal, the request includes the Operator Node identity;
checking in the Service Provider node that the Operator node identity relates to an operator having an agreement with the Service Provider;
if there is an agreement then:
sending information to the terminal about the Service Provider;
receiving an MSAA generated by the Operator;
validating of the received MSAA;
registering the user; and
delivering the service to the terminal.

9. An authentication method in a Service Provider Node according to claim 8 further comprising that the service is a certificate and the registering of the user is followed by generation of a user certificate which is delivered to the terminal.

10. An authentication method in a Service Provider Node according to claim 8 further comprising that the service is a subscription.

* * * * *